(12) United States Patent
Rumpler et al.

(10) Patent No.: US 12,153,160 B2
(45) Date of Patent: *Nov. 26, 2024

(54) SYNCHRONIZATION OF MULTIPLE mmWAVE DEVICES

(71) Applicant: Infineon Technologies AG, Neubiberg (DE)

(72) Inventors: Christoph Rumpler, Munich (DE); Reinhard-Wolfgang Jungmaier, Alkoven (AT); Dennis Noppeney, Cologne (DE); Saverio Trotta, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,490

(22) Filed: Oct. 5, 2023

(65) Prior Publication Data
US 2024/0036161 A1 Feb. 1, 2024

Related U.S. Application Data

(63) Continuation of application No. 16/779,104, filed on Jan. 31, 2020, now Pat. No. 11,808,883.

(51) Int. Cl.
*G01S 7/40* (2006.01)
*G01S 7/00* (2006.01)
*G01S 13/87* (2006.01)

(52) U.S. Cl.
CPC .............. *G01S 7/40* (2013.01); *G01S 7/003* (2013.01); *G01S 13/87* (2013.01)

(58) Field of Classification Search
CPC . G01S 7/40; G01S 7/003; G01S 13/87; G01S 13/931; G01S 7/0235; G01S 7/4008; G01S 7/02
See application file for complete search history.

(56) References Cited

U.S. PATENT DOCUMENTS 4,241,347 A 12/1980 Albanese et al.
6,147,572 A 11/2000 Kaminski et al.
(Continued)

FOREIGN PATENT DOCUMENTS

CN 1463161 A 12/2003
CN 1716695 A 1/2006
(Continued)

OTHER PUBLICATIONS

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

(Continued)

*Primary Examiner* — Bernarr E Gregory
*Assistant Examiner* — Juliana Cross
(74) *Attorney, Agent, or Firm* — Slater Matsil, LLP

(57) ABSTRACT

In an embodiment, a method includes: receiving a global trigger with a first millimeter-wave radar; receiving the global trigger with a second millimeter-wave radar; generating a first internal trigger of the first millimeter-wave radar after a first offset duration from the global trigger; generating a second internal trigger of the second millimeter-wave radar after a second offset duration from the global trigger; start transmitting first millimeter-wave radar signals with the first millimeter-wave radar based on the first internal trigger; and start transmitting second millimeter-wave radar signals with the second millimeter-wave radar based on the second internal trigger, where the second offset duration is different from the first offset duration, and where the first and second millimeter-wave radar signals are transmitted sequentially so as to exhibit no temporal overlap.

20 Claims, 4 Drawing Sheets

(56) References Cited

U.S. PATENT DOCUMENTS

| | | |
|---|---|---|
| 6,414,631 B1 | 7/2002 | Fujimoto |
| 6,636,174 B2 | 10/2003 | Arikan et al. |
| 7,048,973 B2 | 5/2006 | Sakamoto et al. |
| 7,057,564 B2 | 6/2006 | Tsai et al. |
| 7,171,052 B2 | 1/2007 | Park |
| 7,317,417 B2 | 1/2008 | Arikan et al. |
| 7,596,241 B2 | 9/2009 | Rittscher et al. |
| 7,692,574 B2 | 4/2010 | Nakagawa |
| 7,873,326 B2 | 1/2011 | Sadr |
| 7,889,147 B2 | 2/2011 | Tam et al. |
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,413,079 B2 | 8/2016 | Kamgaing et al. |
| 9,495,600 B2 | 11/2016 | Heu et al. |
| 9,886,095 B2 | 2/2018 | Pothier |
| 9,935,065 B1 | 4/2018 | Baheti et al. |
| 10,481,700 B1 | 11/2019 | Gummadi et al. |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1 | 5/2008 | Kurtz et al. |
| 2008/0238759 A1 | 10/2008 | Carocari et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0207805 A1 | 8/2010 | Haworth |
| 2011/0299433 A1 | 12/2011 | Darabi et al. |
| 2012/0087230 A1 | 4/2012 | Guo et al. |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0265486 A1 | 10/2012 | Klofer et al. |
| 2012/0268314 A1 | 10/2012 | Kuwahara et al. |
| 2012/0280900 A1 | 11/2012 | Wang et al. |
| 2013/0027240 A1 | 1/2013 | Chowdhury |
| 2013/0106673 A1 | 5/2013 | McCormack et al. |
| 2014/0028542 A1 | 1/2014 | Lovitt et al. |
| 2014/0070994 A1 | 3/2014 | Schmalenberg et al. |
| 2014/0145883 A1 | 5/2014 | Baks et al. |
| 2014/0324888 A1 | 10/2014 | Xie et al. |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0325925 A1 | 11/2015 | Kamgaing et al. |
| 2015/0346820 A1 | 12/2015 | Poupyrev et al. |
| 2015/0348821 A1 | 12/2015 | Iwanaga et al. |
| 2015/0364816 A1 | 12/2015 | Murugan et al. |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0135655 A1 | 5/2016 | Ahn et al. |
| 2016/0146931 A1 | 5/2016 | Rao et al. |
| 2016/0146933 A1 | 5/2016 | Rao et al. |
| 2016/0178730 A1 | 6/2016 | Trotta et al. |
| 2016/0187462 A1 | 6/2016 | Altus et al. |
| 2016/0191232 A1 | 6/2016 | Subburaj et al. |
| 2016/0223651 A1 | 8/2016 | Kamo et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar et al. |
| 2016/0334502 A1 | 11/2016 | Ali et al. |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0235692 A1* | 8/2017 | Ahamed ............... G06F 1/3215 710/308 |
| 2017/0364160 A1 | 12/2017 | Malysa et al. |
| 2018/0046255 A1 | 2/2018 | Rothera et al. |
| 2018/0074173 A1* | 3/2018 | Trotta ................... G01S 13/931 |
| 2018/0101239 A1 | 4/2018 | Yin et al. |
| 2018/0115409 A1* | 4/2018 | Nayyar ................. G01S 13/343 |
| 2018/0225230 A1* | 8/2018 | Litichever ............. G06F 21/82 |
| 2019/0173528 A1* | 6/2019 | Keehr .................... H04B 1/38 |
| 2019/0350465 A1 | 11/2019 | Sahin et al. |
| 2019/0386665 A1* | 12/2019 | Shalita ................. H03L 7/081 |
| 2020/0003862 A1* | 1/2020 | Doaré .................. H03M 1/1245 |
| 2020/0025870 A1* | 1/2020 | Melzer ................. G01S 7/032 |
| 2021/0149834 A1* | 5/2021 | Fletcher ................ H04B 5/72 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |

(56) References Cited

FOREIGN PATENT DOCUMENTS

| WO | 2007060069 | A1 | 5/2007 |
|---|---|---|---|
| WO | 2013009473 | A2 | 1/2013 |
| WO | 2016033361 | A1 | 3/2016 |

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.
Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.
Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.
Deacon, Peter et al., "Frequency Modulated Continuous Wave (FMCW) Radar," Design Team 6 Technical Lecture, Nov. 9, 2011, 27 pages.
Dham, Vivek "Programming Chirp Parameters in TI Radar Devices," Application Report SWRA553, Texas Instruments, May 2017, 15 pages.
Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.
Dooring Alert Systems, "Riders Matter," http:\\dooringalertsystems.com, printed Oct. 4, 2017, 16 pages.
Filippelli, Mario et al., "Respiratory dynamics during laughter," J Appl Physiol, (90), op. 1441-1446, Apr. 2001, http://jap.physiology.org/content/jap/90/4/1441.full.pdf.
Fox, Ben, "The Simple Technique That Could Save Cyclists' Lives," https://www.outsideonline.com/2115116/simple-technique-could-save-cyclists-lives, Sep. 19, 2016, 6 pages.
Gu, Changzhan et al., "Assessment of Human Respiration Patterns via Noncontact Sensing Using Doppler Multi-Radar System", Sensors, Mar. 2015, 15(3), pp. 6383-6398, doi: 10.3390/s150306383.
Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.
Inac, Ozgur et al., "A Phased Array RFIC with Built-In Self-Test Capabilities," IEEE Transactions on Microwave Theory and Techniques, vol. 60, No. 1, Jan. 2012, 10 pages.
Infineon, "BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.
Killedar, Abdulraheem "XWR1xxx Power Management Optimizations—Low Cost LC Filter Solution," Application Report SWRA577, Texas Instruments, Oct. 2017, 19 pages.
Kizhakkel, V., "Pulsed Radar Target Recognition Based on Micro-Doppler Signatures Using Wavelet Analysis", A Thesis, Graduate Program in Electrical and Computer Engineering, Ohio State University, January 2013-May 2013, 118 pages.
Kuehnke, Lutz "Phased Array Calibration Procedures Based on Measured Element Patterns," Eleventh International Conference on Antennas and Propagation, IEEE Conf., Publ. No. 480, Apr. 17-20, 2001, 4 pages.
Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.
Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/ s40064-015-1583-5; Jan. 2016, 16 pages.
Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.
Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.
Richards, Mark A., "Fundamentals of Radar Signal Processing," McGraw Hill Electronic Engineering, ISBN: 0-07-144474-2, Jun. 2005, 93 pages.
Schroff, Florian et al., "FaceNet: A Unified Embedding for Face Recognition and Clustering," CVF, CVPR2015, IEEE Computer Society Conference on Computer Vision and Pattern Recognition, Mar. 12, 2015, pp. 815-823.
Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.
Suleymanov, Suleyman, "Design and Implementation of an FMCW Radar Signal Processing Module for Automotive Applications," Master Thesis, University of Twente, Aug. 31, 2016, 61 pages.
Thayaparan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.
Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.
Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.

* cited by examiner

SYNCHRONIZATION OF MULTIPLE mmWAVE DEVICES

This application claims is a continuation application of U.S. patent Ser. No. 16/779,104, filed on Jan. 31, 2021, now U.S. Pat. No. 11,808,883, which application is hereby incorporated herein by reference.

TECHNICAL FIELD

The present disclosure relates generally to an electronic system and method, and, in particular embodiments, to synchronization of multiple millimeter-wave (mmWave) devices.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay, phase, and/or frequency difference between the transmission and reception of the frequency modulated signal. Accordingly, some radar systems include a transmit antenna to transmit the radio-frequency (RF) signal, a receive antenna to receive the RF, as well as the associated RF circuits used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

SUMMARY

In accordance with an embodiment, a method includes: receiving a global trigger with a first millimeter-wave radar; receiving the global trigger with a second millimeter-wave radar; generating a first internal trigger of the first millimeter-wave radar after a first offset duration from the global trigger; generating a second internal trigger of the second millimeter-wave radar after a second offset duration from the global trigger; start transmitting first millimeter-wave radar signals with the first millimeter-wave radar based on the first internal trigger; and start transmitting second millimeter-wave radar signals with the second millimeter-wave radar based on the second internal trigger, where the second offset duration is different from the first offset duration, and where the first and second millimeter-wave radar signals are transmitted sequentially so as to exhibit no temporal overlap.

In accordance with an embodiment, a system includes an application processor, and first and second millimeter-wave radars. The application processor is configured to generate a global trigger. The first millimeter-wave radar includes: a first timer configured to generate a first internal trigger after a first offset duration from the global trigger, a first millimeter-wave radar sensor circuit, and a first controller configured to generate first millimeter-wave radar signals based on the first internal trigger using the first millimeter-wave radar sensor circuit. The second millimeter-wave radar includes: a second timer configured to generate a second internal trigger after a second offset duration from the global trigger, a second millimeter-wave radar sensor circuit, and a second controller configured to generate second millimeter-wave radar signals based on the second internal trigger using the second millimeter-wave radar sensor circuit, where the second offset duration is different from the first offset duration so that the first and second millimeter-wave radar signals are transmitted sequential and without temporal overlap.

In accordance with an embodiment, a system includes an application processor, and first and second millimeter-wave radars. The application processor is configured to generate a global trigger. The first millimeter-wave radar includes: a first trigger terminal configured to receive the global trigger, a first timer configured to generate a first internal trigger after a first offset duration from the global trigger, a first millimeter-wave radar sensor circuit, and a first controller configured to generate first millimeter-wave radar signals based on the first internal trigger using the first millimeter-wave radar sensor circuit. The second millimeter-wave radar includes: a second trigger terminal configured to receive the global trigger, a second timer configured to generate a second internal trigger after a second offset duration from the global trigger, a second millimeter-wave radar sensor circuit, and a second controller configured to generate second millimeter-wave radar signals based on the second internal trigger using the second millimeter-wave radar sensor circuit, where the second offset duration is different from the first offset duration so that the first and second millimeter-wave radar signals are transmitted sequentially and without temporal overlap.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
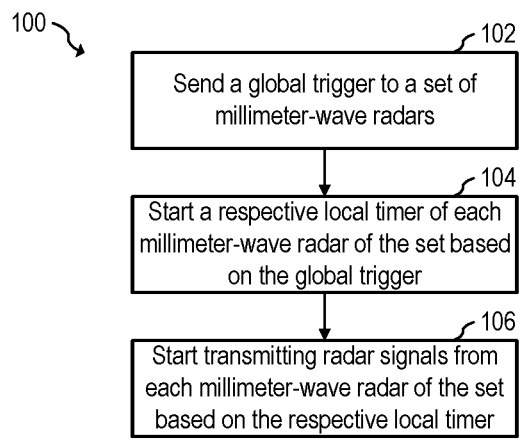
FIG. 1 shows a flow chart of an embodiment method for synchronizing multiple millimeter-wave radars, according to an embodiment of the present invention.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a circuit and method for synchronization of multiple millimeter-wave devices, such as millimeter-wave radars. Embodiments of the present invention may be used to synchronize other types of millimeter-wave devices, such as 5G communication devices, e.g., operating in multiple-input multiple-output (MIMO) configuration. Some embodiments may be used to synchronize other types of devices that do not operate in the millimeter-wave frequency regime.

In an embodiment of the present invention, multiple devices are synchronized by using a local synchronization circuit implemented in each of the multiple devices. A global trigger is sent to each of the multiple devices instead of using dedicated triggers for each device. Timing in each device is based on the local synchronization circuit and the global trigger.

In many applications, multiple devices rely on a synchronization mechanism during normal operation. For example, in some applications, multiple millimeter-wave radars that are located in different portions of a printed circuit board (PCB) rely on a synchronization mechanism, e.g., to avoid radio-frequency (RF) interference of transmitted chirps and/ or to perform functions such as beamforming. Conventionally, an application processor synchronizes the millimeter-wave radars by sending dedicated trigger signals, at appropriate times, to each of the millimeter-wave radars using dedicated lines electrically connected to each of the millimeter-wave radars. In other words, the burden is placed on the application processor to ensure correct timing.

In an embodiment of the present invention, a local synchronization circuit implemented in each millimeter-wave radar is used to control the timing of chirps based on a common global trigger. Each local synchronization circuit has a unique time offset that delays the start of the first chirp by a unique offset duration. In some embodiments, an identical finite state machine (FSM) is used in each radar to control the timing between chirps, the duration of each chirp, and the start of the first chirp, where the delay applied by each finite state machine is, e.g., programmed to be unique to each millimeter-wave radar.

FIG. 1 shows a flow chart of embodiment method 100 for synchronizing multiple millimeter-wave radars, according to an embodiment of the present invention.

During step 102, a global trigger is sent, e.g., by an application processor, to a set of millimeter-wave radars. In some embodiments, the global trigger is sent using a trigger line, e.g., a PCB trace, connected to a general purpose I/O (GPIO) terminal of the application processor, where the trigger line is connected to a trigger terminal of each of the millimeter-wave radars. In some embodiments, the global trigger is sent using a communication interface, such as inter-integrated circuit ($I^2C$) or serial peripheral interphase (SPI). For example, in some embodiments, the global trigger may be sent using SPI Broadcast Mode, such as described in co-pending U.S. patent application Ser. No. 16/779,126, filed on the same day as this application, entitled "SPI Broadcast Mode," which application is hereby incorporated herein by reference.

During step 104, each of the millimeter-wave radars receive the global trigger and starts a respective local timer based on the global trigger. In some embodiments, the local timer is implemented with a digital counter. For example, in some embodiments each local counter counts up to a predetermined count, where the predetermined count is different for each of the millimeter-wave radars of the set. In some embodiments, each predetermined count may be programmed, e.g., using SPI, e.g., by the application processor.

During step 106, when the respective local timer expires (e.g., when the digital counter reaches the predetermined count), the respective millimeter-wave radar begins transmitting radar signals, such as chirps, e.g., sequentially, e.g., in accordance with a respective finite state machine of each millimeter-wave radar. In some embodiments, since each local timer is configured to expire at a different time, the (e.g., sequentially) transmitted chirps from each of the millimeter-wave radars occur at different times, thereby advantageously allowing for avoiding RF interference as well as for allowing for time-division multiplexing (TDM) of chirps from each millimeter-wave radar and for allowing operations such as beamforming, while using a single global trigger.

Figure 2:
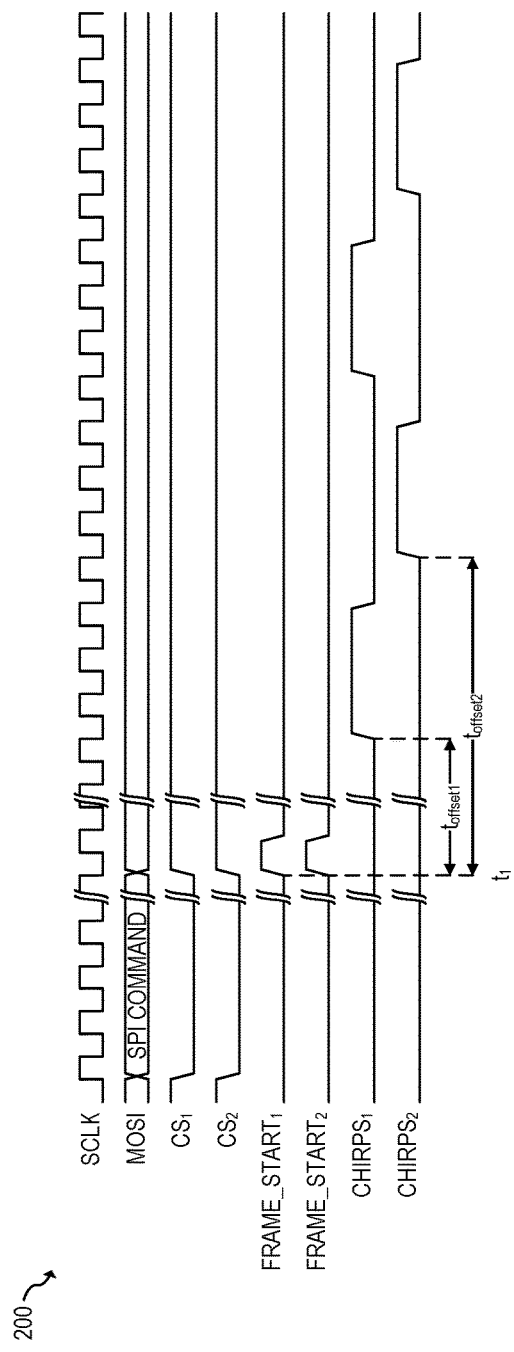
FIG. 2 shows waveforms of signals of a millimeter-wave radar system, according to an embodiment of the present invention.

FIG. 2 shows waveforms 200 of signals of a millimeter-wave radar system, according to an embodiment of the present invention. The waveforms 200 of FIG. 2 correspond to an implementation of method 100 in accordance with an embodiment that uses an SPI Broadcast Mode, and that includes an application processor and first and second millimeter-wave radars.

Waveforms 200 illustrate an SPI clock signal SCLK, an SPI master out slave in (MOSI) signal MOSI, and SPI chip select (CS) signals $CS_1$ and $CS_2$ (corresponding to the first and second millimeter-wave radars).

As shown in FIG. 2, a global trigger is sent (step 102) to both the first and second millimeter-wave radars simultaneously using an SPI write command. The global trigger is received by both the first and second millimeter-wave radars simultaneously at time $t_1$.

Upon receipt of the global trigger, an internal frame start signal is asserted (transitioned to an active state, in this case to a logic 1) to signal the beginning of the transmission process. As shown, each internal frame start signal FRAME_$START_1$ and FRAME_$START_2$ are asserted at the same time upon receipt of the global trigger. In some embodiments, there may be a delay between reception of the global trigger and when the internal frame start signals are asserted.

Each internal frame start signal (FRAME_START$_1$ and FRAME_START$_2$) starts a respective local counter (step 104) that counts until a predetermined count. Each respective count is unique so that each millimeter-wave radar exhibits a respective offset duration ($t_{offset1}$ and $t_{offset2}$) from reception of the global trigger (from $t_1$) that is unique.

Upon elapsing of the respective offset duration ($t_{offset1}$ and $t_{offset2}$), each millimeter-wave radar begins transmitting (step 106) a sequence of chirps (CHIRPS$_1$ and CHIRPS$_2$). As shown in FIG. 2, the transmission of the first (CHIRPS$_1$) and second (CHIRPS$_2$) sequence of chirps (illustrated by assertion of signals CHIRPS$_1$ and CHIRPS$_2$, respectively) do not overlap.

Figure 3:
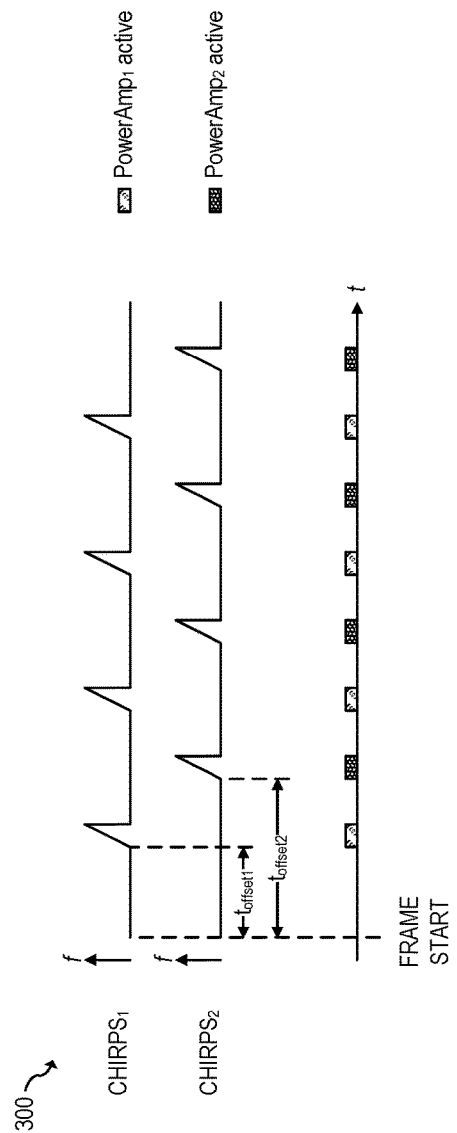
FIG. 3 illustrates chirp transmissions and power amplifier states of the millimeter-wave radars of FIG. 2, according to an embodiment of the present invention.

FIG. 3 illustrates chirp transmissions and power amplifier states of the millimeter-wave radars of FIG. 2, according to an embodiment of the present invention. The waveforms 300 of FIG. 3 correspond to an implementation of method 100, such as shown in FIG. 2.

As shown in FIG. 3, the sequence of chirps from the first and second millimeter-wave radars (CHIRPS$_1$ and CHIRPS$_2$, respective) do not overlap. As also shown in FIG. 3, the active times of the respective power amplifies of the first and second millimeter-wave radars (PowerAmp$_1$ and PowerAmp$_2$) also do not overlap.

By avoiding overlap of chirps and active times of power amplifiers, some embodiments advantageously avoid RF interference between transmitted radar signals of the millimeter-wave radars. Some embodiments advantageously avoid RF interference without burdening the application processor to ensure correct timing.

Additional advantages of some embodiments include lower risk that the correct timing is not ensure due to, e.g., unexpected interrupts, that may consume processing resources, e.g., of the application processor.

FIGS. 2 and 3 illustrate an embodiment that includes two millimeter-wave radars and an application processor. It is understood that more than two millimeter-wave radars may be used such as n, where n is a positive integer greater than 2, such as 4, 5, 10, 16, 32, or more, and where the respective offset duration ($t_{offset1}$, $t_{offset2}$, ..., $t_{offsetn}$) may be adjusted so that the there is no overlap between each respective sequence of chirps (CHIRPS$_1$, CHIRPS$_2$, ..., CHIRPS$_n$).

Figure 4:
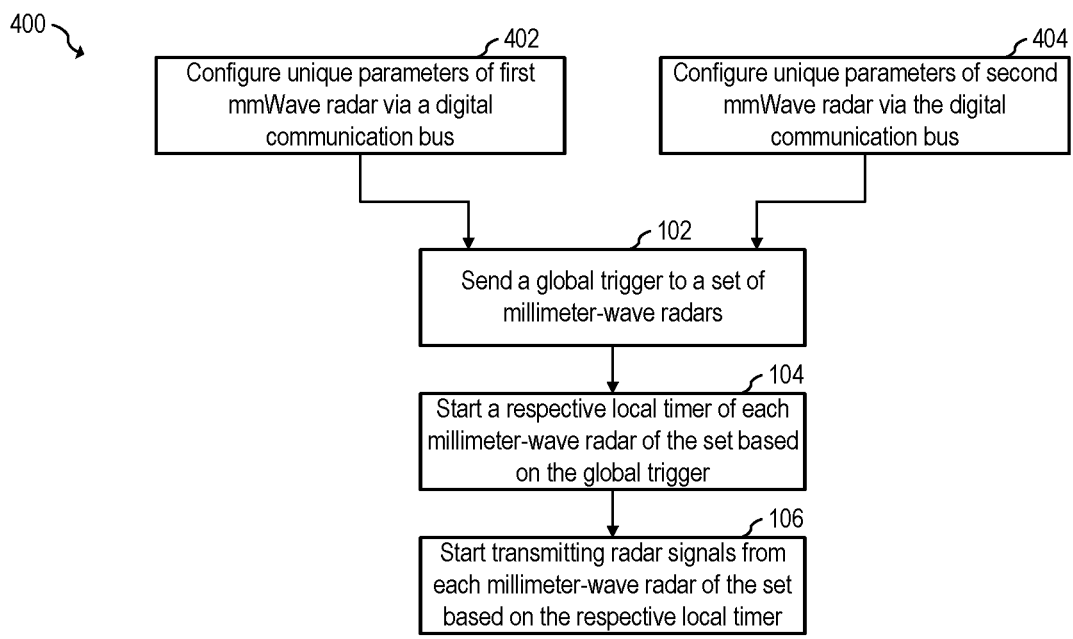
FIG. 4 shows a flow chart of an embodiment method for programming and synchronizing multiple millimeter-wave radars, according to an embodiment of the present invention.

FIG. 4 shows a flow chart of embodiment method 400 for programming and synchronizing multiple millimeter-wave radars, according to an embodiment of the present invention.

During step 402, the first millimeter-wave radar is programmed with a first time offset threshold, e.g., via a digital communication bus, such as via SPI. During step 404, the second millimeter-wave radar is programmed with a second time offset threshold, e.g., via a digital communication bus, such as via SPI.

In some embodiments, the programming of the first time offset threshold is performed, e.g., by the application processor via, e.g., SPI. In some embodiments, the programming of the first time offset threshold is performed, e.g., by an automated test equipment (ATE) during production testing of the millimeter-wave radars. Other implementations are also possible.

Steps 102, 104, and 106 may be performed, e.g., as described with respect to FIG. 1.

Figure 5:
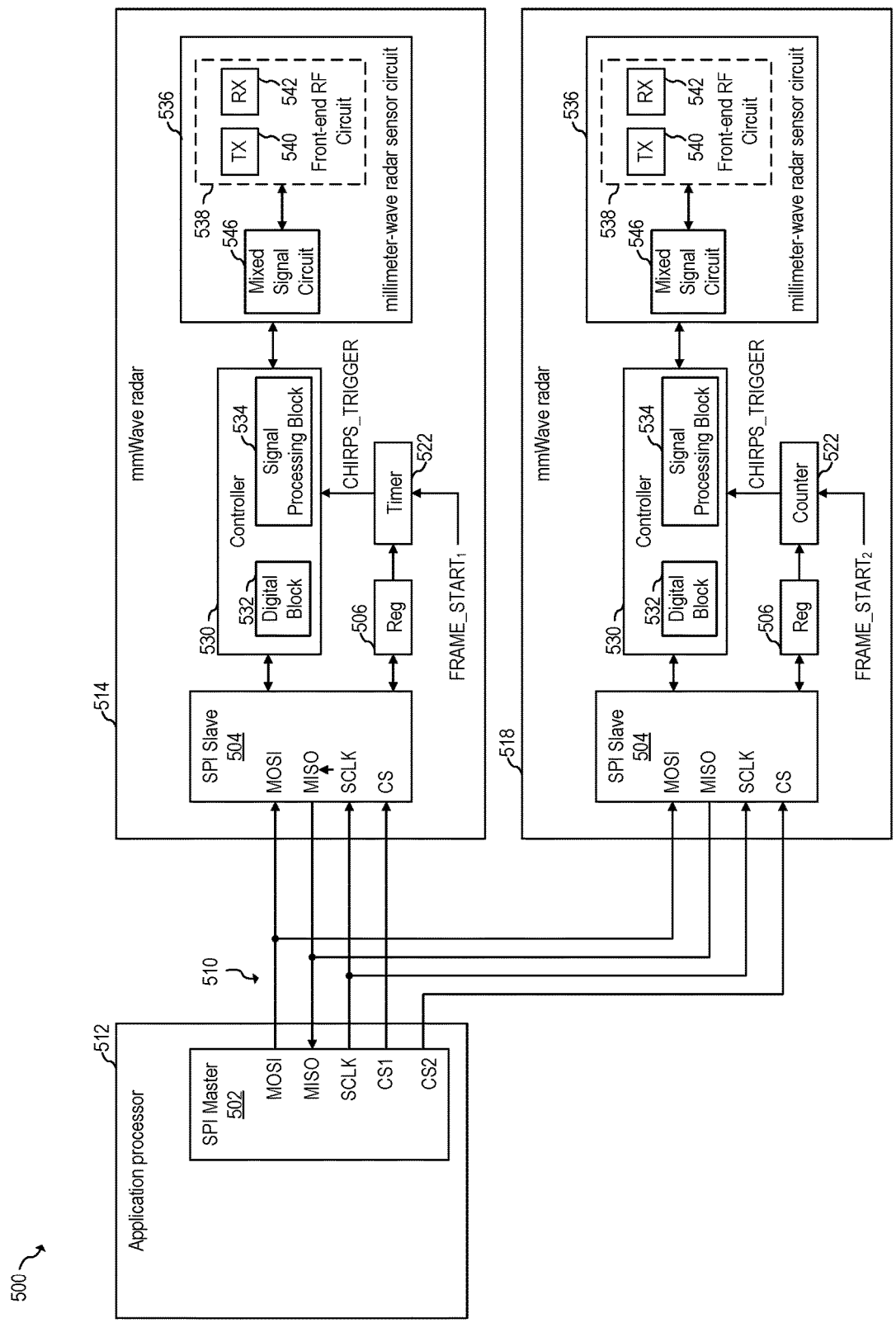
FIGS. 5 and 6 show schematic diagrams of millimeter-wave systems, according to embodiments of the present invention.

FIG. 5 shows a schematic diagram of millimeter-wave system 500, according to an embodiment of the present invention. Millimeter-wave system 500 includes application processor 512, and millimeter-wave radars 514 and 518.

Some embodiments may include more than two millimeter-wave radars, such as 3, 10, 64, or more.

During normal operation, application processor 512 configures the first and second time offset thresholds (steps 402 and 404) in respective registers 506 of millimeter-wave radars 514 and 518, where the first time offset threshold is different from the second time offset threshold. In some embodiments, application processor 512 may also configure other parameters (e.g., in other registers not shown in FIG. 5), such as distances between chirps, duration of chirps, chirp start and end frequencies, etc. Generally, however, the other parameters programmed may be the same for all millimeter-wave radars.

After configuring the first and second time offset thresholds, application processor 512 sends a global trigger (step 102) to millimeter-wave radars 514 and 518, e.g., using SPI bus 510. For example, in some embodiments, application processor 512 sends the global trigger using SPI Broadcast Mode. In other embodiments, the global trigger may be sent in other ways, such as by using a GPIO of application processor 512 that is coupled to both of the millimeter-wave radars 514 and 518.

When the global trigger is received, each millimeter-wave radar 514 and 518 starts their respective local timer 522. Each local timer is configured to generate a local trigger signal CHIRPS_TRIGGER when their respective time offset threshold is reached.

The local trigger signal then causes the respective controller 530 to begin transmitting chirps, e.g., sequentially (e.g., such as shown in FIGS. 3 and 4) using the respective millimeter-wave radar sensor circuit 536.

In some embodiments, since each local trigger CHIRPS_TRIGGER depends on the respective data programmed in respective register 506, it is possible to have controllers 530 with identical hardware for both millimeter-wave radars 514 and 518 while achieving non-overlapping chirp sequences when using a single global trigger, thereby advantageously relieving application processor 512 from the task of maintaining proper timing of the millimeter-wave radars 514 and 518.

Millimeter-wave radar system may be implemented, e.g., in a printed circuit board (PCB), where SPI bus 510 includes PCB traces coupling application processor 512 with millimeter-wave radars 514 and 518. In some embodiments, millimeter-wave radars 514 and 518 have identical hardware.

SPI master 502 and SPI slaves 504 may be implemented in any way known in the alt. For example, SPI slaves 504 may be implemented without support for SPI Broadcast Mode. In such embodiments, each millimeter-wave radar 514 and 518 may include a trigger terminal (not shown) coupled to a global trigger terminal of application processor 512 (not shown). In some embodiments, SPI slaves 504 may implement SPI Broadcast Mode.

Timer 522 may be implemented in any way known in the alt For example, in some embodiments, timer 522 may be implemented with a digital counter such as a digital up-counter that counts up, upon receipt of the frame start signal, to the time offset thresholds stored in register 506. Other embodiments may be implemented with a digital down-counter, or a digital up/down-counter, for example. Other implementations are also possible.

As shown in FIG. 5, each of millimeter-wave radars 514 and 518 include SPI slave 504, controller 530, millimeter-wave radar sensor circuit 536, register 506, and timer 522. Each of millimeter-wave radars 514 and 518 is configured to perform radar functions, such as target detection and tracking, for example. Radar functions, such as target detection and tracking may be performed in any way known in the art.

In some embodiments, part or all of the radar operations may be performed in cooperation with application processor 512. For example, in some embodiments, millimeter-wave radars 514 and 518 may cooperate with application processor 512 to perform beamforming. Beamforming may be performed in any way known in the art. In some embodiments, millimeter-wave radars 514 and 518 may cooperate with application processor 512 to send the chirps in such a manner as to achieve time division multiplexing (TDM). For example, in some embodiments, raw data coming from different millimeter-wave radars (e.g., 514 and 518) can be used for TDM MIMO when the (e.g., known) delay is taken into account. Other radar functions are also possible.

Millimeter-wave radar sensor circuit 536 is configured to transmit and receive radar signals, such as chirps. In some embodiments, millimeter-wave radar sensor circuit 536 may be implemented as a frequency modulated continuous wave (FMCW) sensor.

Millimeter-wave radar sensor circuit 536 may be implemented in any way known in the att. For example, in some embodiments, millimeter-wave radar sensor circuit includes front-end RF circuit 538, and mixed signal circuit 546.

RF circuit 538 is configured to transmit signals (e.g., chirps) towards target(s) and to receive the echo (i.e., reflection) signal from the target(s) in its field of view using one or more antennas (not shown). RF circuit 538 includes transmitter circuit 540 and receiver circuit 542.

Transmitter circuit 540 and receiver circuit 542 may be implemented in any way known in the art. For example, in some embodiments, transmitter circuit 540 includes power amplifiers that amplify the chirps to be transmitted via one or more antenna(s) (not shown).

Mixed signal circuit 546 is configured to control RF circuit 538 to transmit signals (e.g., chirps), and to receive the echo signal. Mixed signal circuit 546 is also configured to translate the RF signals into digital signals that are then transmitted to controller 530.

Mixed signal circuit 546 may be implemented in any way known in the art. For example, in some embodiments, mixed signal circuit 546 includes one or more band-pass filters (BPFs), low-pass filters (LPFs), mixers, low-noise amplifier (LNA), intermediate frequency (IF) amplifiers, phase-locked loops (PLLs) and analog-to-digital converters (ADCs).

Controller 530 is configured to process the signals received from millimeter-wave radar sensor circuit 536 and transmit it to application processor 512, e.g., via SPI bus 510.

Controller 530 may be implemented in any way known in the aft, such as a general purpose controller or processor, application-specific integrated circuit (ASIC), or any other implementation. Controller 530 typically includes digital block 532 for general control purposes (e.g., controlling millimeter-wave radar sensor circuit 536) and a signal processing block 534 for processing the signals received from millimeter-wave radar sensor circuit 536. Digital block 532 may include a finite state machine (FSM), e.g., to control timing of the chirps transmitted. Signal processing block 534 may be implemented with a digital signal processor (DSP).

In some embodiments, millimeter-wave radar sensor circuit 536, controller 530, register 506, timer 522, and SPI slave 504 are implemented inside the same package. Some embodiments also include one or more antenna(s) (not shown) inside the same package. Other embodiments may implement one or more of the millimeter-wave radar sensor circuit 536, controller 530, register 506, timer 522, and SPI slave 504 as discrete components of the millimeter-wave radar, e.g., coupled to the same PCB. Other embodiments implement millimeter-wave system 500 using more than one PCB. Other implementations are also possible.

Application processor 512 may be implemented in any way known in the aft, such as a general purpose controller or processor, ASIC, or any other implementation.

Figure 6:
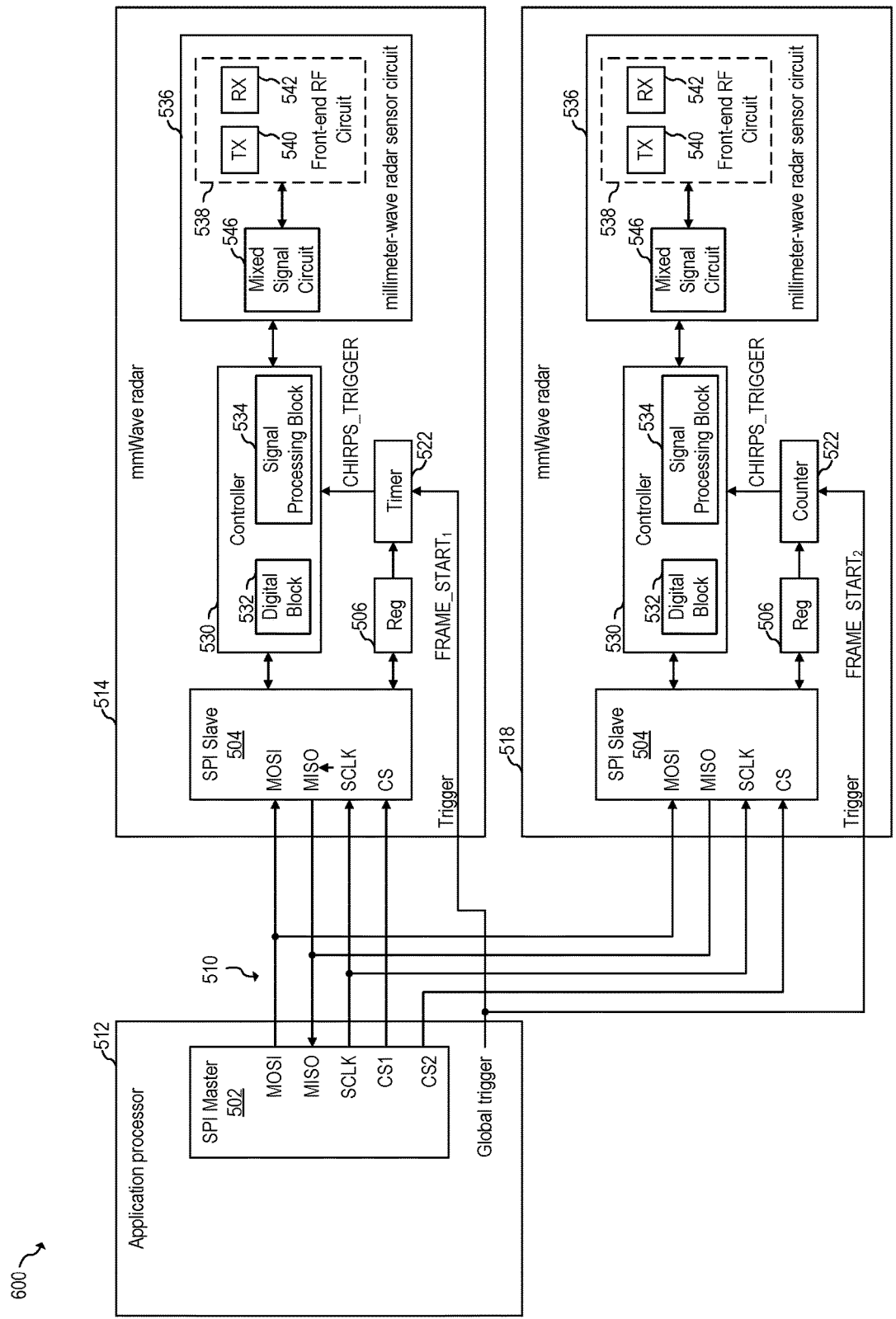

FIG. 6 shows a schematic diagram of millimeter-wave system 600, according to an embodiment of the present invention. Millimeter-wave system 600 operates in a similar manner as millimeter-wave system 500. Millimeter-wave system 600, however, includes a global trigger line coupled between a GPIO of application processor 512 and the millimeter-wave radars 514 and 518. The global trigger line may be implemented, e.g., as a trace in the PCB.

Example embodiments of the present invention are summarized here. Other embodiments can also be understood from the entirety of the specification and the claims filed herein.

Example 1. A method including: receiving a global trigger with a first millimeter-wave radar; receiving the global trigger with a second millimeter-wave radar; generating a first internal trigger of the first millimeter-wave radar after a first offset duration from the global trigger; generating a second internal trigger of the second millimeter-wave radar after a second offset duration from the global trigger; start transmitting first millimeter-wave radar signals with the first millimeter-wave radar based on the first internal trigger; and start transmitting second millimeter-wave radar signals with the second millimeter-wave radar based on the second internal trigger, where the second offset duration is different from the first offset duration, and where the first and second millimeter-wave radar signals are transmitted sequentially so as to exhibit no temporal overlap.

Example 2. The method of example 1, further including generating the global trigger with an application processor.

Example 3. The method of one of examples 1 or 2, further including generating the global trigger using a general purpose input/output (GPIO) pin of the application processor, where the GPIO pin is coupled to the first and second millimeter-wave radars.

Example 4. The method of one of examples 1 to 3, further including generating the global trigger using a master out slave in (MOSI) line of a serial peripheral interface (SPI).

Example 5. The method of one of examples 1 to 4, further including: programming the first offset duration into the first millimeter-wave radar; and programming the second offset duration into the second millimeter-wave radar.

Example 6. The method of one of examples 1 to 5, further including: after receiving the global trigger by the first millimeter-wave radar, starting a first digital counter of the first millimeter-wave radar, and when a first count of the first digital counter reaches a first time offset threshold corresponding to the first offset duration, generating the first internal trigger; and after receiving the global trigger by the second millimeter-wave radar, starting a second digital counter of the second millimeter-wave radar, and when a second count of the second digital counter reaches a second time offset threshold corresponding to the second offset duration, generating the second internal trigger.

Example 7. The method of one of examples 1 to 6, where the first time offset threshold is stored in a first register of the first millimeter-wave radar, and where the second time offset threshold is stored in a second register of the second millimeter-wave radar.

Example 8. The method of one of examples 1 to 7, further including: programming the first time offset threshold into the first register; and programming the second time offset threshold into the second register.

Example 9. The method of one of examples 1 to 8, further including performing beamforming using the first and second millimeter-wave radars.

Example 10. A system including: an application processor configured to generate a global trigger; a first millimeter-wave radar including: a first timer configured to generate a first internal trigger after a first offset duration from the global trigger, a first millimeter-wave radar sensor circuit, and a first controller configured to generate first millimeter-wave radar signals based on the first internal trigger using the first millimeter-wave radar sensor circuit; and a second millimeter-wave radar that includes: a second timer configured to generate a second internal trigger after a second offset duration from the global trigger, a second millimeter-wave radar sensor circuit, and a second controller configured to generate second millimeter-wave radar signals based on the second internal trigger using the second millimeter-wave radar sensor circuit, where the second offset duration is different from the first offset duration so that the first and second millimeter-wave radar signals are transmitted sequential and without temporal overlap.

Example 11. The system of example 10, where the first millimeter-wave radar further includes a first serial peripheral interface (SPI) slave circuit, where the second millimeter-wave radar further includes a second SPI slave circuit, and where the application processor includes an SPI master circuit coupled to the first and second SPI slave circuits via an SPI bus.

Example 12. The system of one of examples 10 or 11, where the application processor is configured to send the global trigger to the first and second SPI slave circuits using the SPI bus.

Example 13. The system of one of examples 10 to 12, where the application processor is configured to: program the first offset duration into the first millimeter-wave radar using the SPI bus; and program the second offset duration into the second millimeter-wave radar using the SPI bus.

Example 14. The system of one of examples 10 to 13, further including a printed circuit board (PCB) coupled to the application processor, and to the first and second millimeter-wave radars, where the PCB includes the SPI bus.

Example 15. The system of one of examples 10 to 14, where the first timer includes a first counter, where the first millimeter-wave radar further includes a first register configured to store a first time offset threshold corresponding to the first offset duration, where the second timer includes a second counter, and where the second millimeter-wave radar further includes a second register configured to store a second time offset threshold corresponding to the second offset duration.

Example 16. The system of one of examples 10 to 15, where the first counter is configured to start counting up after receiving the global trigger, and to generate the first internal trigger when a first count of the first counter reaches the first time offset threshold, and where the second counter is configured to start counting up after receiving the global trigger, and to generate the second internal trigger when a second count of the second counter reaches the second time offset threshold.

Example 17. The system of one of examples 10 to 16, where the application processor is configured to send the global trigger using a GPIO terminal that is coupled to respective trigger terminals of the first and second millimeter-wave radars.

Example 18. A system including: an application processor configured to generate a global trigger; a first millimeter-wave radar including: a first trigger terminal configured to receive the global trigger, a first timer configured to generate a first internal trigger after a first offset duration from the global trigger, a first millimeter-wave radar sensor circuit, and a first controller configured to generate first millimeter-wave radar signals based on the first internal trigger using the first millimeter-wave radar sensor circuit; and a second millimeter-wave radar that includes: a second trigger terminal configured to receive the global trigger, a second timer configured to generate a second internal trigger after a second offset duration from the global trigger, a second millimeter-wave radar sensor circuit, and a second controller configured to generate second millimeter-wave radar signals based on the second internal trigger using the second millimeter-wave radar sensor circuit, where the second offset duration is different from the first offset duration so that the first and second millimeter-wave radar signals are transmitted sequentially and without temporal overlap.

Example 19. The system of example 18, where the first millimeter-wave radar further includes a first serial peripheral interface (SPI) slave circuit, where the second millimeter-wave radar further includes a second SPI slave circuit, where the application processor includes an SPI master circuit coupled to the first and second SPI slave circuits via an SPI bus, and where the application processor is configured to: program the first offset duration into the first millimeter-wave radar using the SPI bus; and program the second offset duration into the second millimeter-wave radar using the SPI bus.

Example 20. The system of one of examples 18 or 19, where the first timer includes a first counter, where the first millimeter-wave radar further includes a first register configured to store a first time offset threshold corresponding to the first offset duration, where the second timer includes a second counter, and where the second millimeter-wave radar further includes a second register configured to store a second time offset threshold corresponding to the second offset duration.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method comprising:
transmitting a global trigger to first and second millimeter-wave radars via a serial bus using a data line of a first serial interface circuit without using a signal line dedicated only to the global trigger, wherein a frequency of the global trigger is less than a frequency of a clock signal of the first serial interface circuit;
generating a first internal trigger of the first millimeter-wave radar in response to the global trigger;
generating a second internal trigger of the second millimeter-wave radar in response to the global trigger;
start transmitting first millimeter-wave radar signals with the first millimeter-wave radar based on the first internal trigger; and start transmitting second millimeter-wave radar signals with the second millimeter-wave radar based on the second internal trigger.

2. The method of claim 1, further comprising generating the global trigger with an application processor.

3. The method of claim 1, further comprising transmitting the global trigger via a master out slave in (MOSI) line of a serial peripheral interface (SPI).

4. The method of claim 1, wherein:
generating the first internal trigger comprises generating the first internal trigger of the first millimeter-wave radar after a first offset duration from the global trigger; and
generating the second internal trigger comprises generating the second internal trigger of the second millimeter-wave radar after a second offset duration from the global trigger, wherein:
the second offset duration is different from the first offset duration, and
the first and second millimeter-wave radar signals are transmitted sequentially so as to exhibit no temporal overlap.

5. The method of claim 4, further comprising:
programming the first offset duration into the first millimeter-wave radar; and
programming the second offset duration into the second millimeter-wave radar.

6. The method of claim 4, further comprising:
after receiving the global trigger by the first millimeter-wave radar, starting a first digital counter of the first millimeter-wave radar, and when a first count of the first digital counter reaches a first time offset threshold corresponding to the first offset duration, generating the first internal trigger; and
after receiving the global trigger by the second millimeter-wave radar, starting a second digital counter of the second millimeter-wave radar, and when a second count of the second digital counter reaches a second time offset threshold corresponding to the second offset duration, generating the second internal trigger.

7. The method of claim 6, wherein the first time offset threshold is stored in a first register of the first millimeter-wave radar, and wherein the second time offset threshold is stored in a second register of the second millimeter-wave radar.

8. The method of claim 7, further comprising:
programming the first time offset threshold into the first register; and
programming the second time offset threshold into the second register.

9. The method of claim 1, further comprising performing beamforming using the first and second millimeter-wave radars.

10. A system comprising:
an application processor comprising a first serial interface circuit coupled to a serial bus, the application processor configured to:
generate a global trigger and transmit the global trigger to first and second millimeter-wave radars using a data line of the first serial interface circuit without using a signal line a dedicated only to the global trigger, wherein a frequency of the global trigger is less than a frequency of a clock signal of the first serial interface circuit;
the first millimeter-wave radar comprising:
a first local serial interface circuit coupled to the serial bus, the first local serial interface circuit configured to receive the global trigger via the serial bus,
a first millimeter-wave radar sensor circuit, and
a first controller configured to generate first millimeter-wave radar signals based on the first internal trigger using the first millimeter-wave radar sensor circuit; and
the second millimeter-wave radar that comprises:
a second local serial interface circuit coupled to the serial bus, the second local serial interface circuit configured to receive the global trigger via the serial bus,
a second millimeter-wave radar sensor circuit, and
a second controller configured to generate second millimeter-wave radar signals based on the second internal trigger using the second millimeter-wave radar sensor circuit.

11. The system of claim 10, wherein the first local serial interface circuit comprises a first serial peripheral interface (SPI) slave circuit, wherein the second local serial interface circuit comprises a second SPI slave circuit, and wherein the first serial interface circuit comprises an SPI master circuit coupled to the first and second SPI slave circuits via an SPI bus.

12. The system of claim 11, further comprising a printed circuit board (PCB) coupled to the application processor, and to the first and second millimeter-wave radars, wherein the PCB comprises the SPI bus.

13. The system of claim 11, wherein:
the first millimeter-wave radar further comprises a first timer configured to generate a first internal trigger after a first offset duration from the global trigger;
the second millimeter-wave radar further comprises a second timer configured to generate a second internal trigger after a second offset duration from the global trigger; and
the second offset duration is different from the first offset duration so that the first and second millimeter-wave radar signals are transmitted sequentially and without temporal overlap.

14. The system of claim 13, wherein the application processor is configured to:
program the first offset duration into the first millimeter-wave radar using the SPI bus; and
program the second offset duration into the second millimeter-wave radar using the SPI bus.

15. The system of claim 13, wherein the first timer comprises a first counter, wherein the first millimeter-wave radar further comprises a first register configured to store a first time offset threshold corresponding to the first offset duration, wherein the second timer comprises a second counter, and wherein the second millimeter-wave radar further comprises a second register configured to store a second time offset threshold corresponding to the second offset duration.

16. The system of claim 15, wherein the first counter is configured to start counting up after receiving the global trigger, and to generate the first internal trigger when a first count of the first counter reaches the first time offset threshold, and wherein the second counter is configured to start counting up after receiving the global trigger, and to generate the second internal trigger when a second count of the second counter reaches the second time offset threshold.

17. A system comprising:

an application processor comprising a first serial interface circuit coupled to a serial bus, the application processor configured to:

generate a global trigger and transmit the global trigger to first and second millimeter-wave radars using the first serial interface circuit without using a dedicated trigger line, wherein the global trigger is transmitted via a master out slave in (MOSI) of a serial peripheral interface (SPI);

the first millimeter-wave radar comprising:

a first local serial interface circuit coupled to the serial bus, the first local serial interface circuit configured to receive the global trigger via the serial bus, a first millimeter-wave radar sensor circuit, and a first controller configured to generate first millimeter-wave radar signals based on the first internal trigger using the first millimeter-wave radar sensor circuit; and the second millimeter-wave radar that comprises:

a second local serial interface circuit coupled to the serial bus, the second local serial interface circuit configured to receive the global trigger via the serial bus, a second millimeter-wave radar sensor circuit, and a second controller configured to generate second millimeter-wave radar signals based on the second internal trigger using the second millimeter-wave radar sensor circuit.

18. The system of claim 17, wherein:

the first millimeter-wave radar further comprises a first timer configured to generate a first internal trigger after a first offset duration from the global trigger;

the second millimeter-wave radar further comprises a second timer configured to generate a second internal trigger after a second offset duration from the global trigger; and the second offset duration is different from the first offset duration so that the first and second millimeter-wave radar signals are transmitted sequentially and without temporal overlap.

19. The system of claim 18, wherein the first local serial interface circuit comprises a first SPI slave circuit, wherein the second local serial interface circuit comprises a second SPI slave circuit, wherein the first serial interface circuit comprises an SPI master circuit coupled to the first and second SPI slave circuits via an SPI bus, and wherein the application processor is configured to:

program the first offset duration into the first millimeter-wave radar using the SPI bus; and program the second offset duration into the second millimeter-wave radar using the SPI bus.

20. The system of claim 18, wherein the first timer comprises a first counter, wherein the first millimeter-wave radar further comprises a first register configured to store a first time offset threshold corresponding to the first offset duration, wherein the second timer comprises a second counter, and wherein the second millimeter-wave radar further comprises a second register configured to store a second time offset threshold corresponding to the second offset duration.

* * * * *